United States Patent [19]
Scimeca

[11] 3,982,577
[45] Sept. 28, 1976

[54] TUBE GUARD

[75] Inventor: Frank M. Scimeca, Brick Town, N.J.

[73] Assignee: Mr. Tuffy Co., Point Pleasant Beach, N.J.

[22] Filed: Apr. 28, 1975

[21] Appl. No.: 571,939

Related U.S. Application Data

[63] Continuation of Ser. No. 351,547, April 16, 1973, abandoned.

[52] U.S. Cl. .............................................. 152/204
[51] Int. Cl.² ......................................... B60C 21/04
[58] Field of Search ......................... 152/203–205, 152/347, 365, 371

[56] References Cited
UNITED STATES PATENTS

| | | |
|---|---|---|
| 1,181,065 | 4/1916 | Coffield .............................. 152/204 |
| 1,371,097 | 3/1921 | Jones ................................. 152/204 |
| 1,460,794 | 7/1923 | Grube ................................ 152/204 |
| 1,474,387 | 11/1923 | Schoneberger ..................... 152/204 |
| 3,111,973 | 11/1963 | Lambach ........................... 152/204 |
| 3,306,331 | 2/1967 | Cherniaew .......................... 152/204 |

*Primary Examiner*—Drayton E. Hoffman
*Attorney, Agent, or Firm*—Larson, Taylor & Hinds

[57] ABSTRACT

The present invention relates to a tube guard for protecting inner tubes of relatively thin tires. The tube guard is comprised of a unitary annular guard member molded from a solid flexible synthetic polymeric material having a high Shore hardness. The guard member includes a central section having a greater cross-section at the mid portion of the central section and two peripheral, generally parallel, tapered sections integral with and extending inwardly from the central section. The outer surface of the tube guard is rough to prevent slippage relative to the outer casing of the tire and the inner surface of the tube guard is smooth to prevent damaging the inner tube.

6 Claims, 5 Drawing Figures

TUBE GUARD

This is a continuation of application Ser. No. 351,547 filed Apr. 16, 1973, now abandoned.

BACKGROUND OF THE INVENTION

1. Field of the Invention

This invention relates to a new and improved protective guard for inner tubes of relatively narrow tires such as bicycle tires. In particular, this invention relates to a novel liner insertable between an outer tire casing and an air-filled inner tube of a tire for protecting the inner tube against punctures and for preventing cracking of the tire casing wall.

2. Description of the Prior Art

The sport of bicycling in the United States is presently undergoing a rejuvenation. This sudden increase in the use of bicycles has put pressure on the industry to produce larger numbers of bicycles and on the tire industry to produce larger numbers of tires to meet the increased demand. However, because of high per unit manufacturing cost and low per unit profit, the bicycle tire industry has not kept pace with the increased demand and has not endeavored to transfer recent innovations and developments in automobile tires to bicycle tires.

There are significant differences between automobile tires and bicycle tires. Consequently many of the innovations and developments of the former can not be incorporated in the latter. In addition, bicycle tires are confronted with different hazards and different degrees of hazards than are automobile tires. Bicycle tires usually are comprised of a narrow outer rubber casing having a thin cross-section and an inner air-filled inner tube; whereas most modern automobile tires are comprised of a single wide tubeless outer casing having a thick cross-section and reinforcing fibers imbedded therein. A simple puncture of a bicycle tire, for example by a nail, will usually render the tire unusable, but this simple puncture in an automobile tire probably will have no effect on the tire because of its puncture sealing capabilities.

The hazard with which a tire is confronted is determined primarily by the use of the tire. Because a bicycle travels at much lower speeds than an automobile, the bicycle is usually restricted to travelling along the edges of streets where the tires are subjected to puncture causing debris such as broken glass, rocks, and nails. Bicycles frequently also are taken along unpaved and usually unimproved routes which subject the tires to unusual stresses. Because bicycles do not have shock mounted wheels, the tires must absorb the full effects of any rough treatment. Should the tires be underinflated, the rough treatment will cause significant compression of the tires and abnormal flexing of the side walls of the tire casing and eventual cracking of the side wall.

However, instead of being equipped with thicker and stronger tires so that the tires can withstand the unusual stresses, bicycles are equipped with relatively narrow tires comprised of a very thin outer casing and an air-inflated inner tube. Consequently a large numbr of bicycles are being disabled by worn and punctured tires and a need exists for bicycle tires which are more resistant to damage and which last longer.

Before automobiles were equipped with their present self-sealing, tubless, steel-belted tires, similar problems occurred in the automotive industry. A number of armored tire interliners were developed to attempt to protect the inner tube against punctures. Usually, however, such interliners caused more problems than they solved. Many of the prior art devices had overlapping ends or separable joints which usually pinched and ruptured the inner tube when the tire was deformed by a bump or the walls of a hole. These interliners also would move relative to the inner tube and the tire casing thereby pinching or wearing away the inner tube. Furthermore, the interliners were relatively thick and heavy, and were designed to be used with tires having thick outer tire casings. In any event, the prior art interliners can not be fabricated in the narrow widths, and light weights thus providing the degrees of flexibility needed by bicycle tires. Hence, the prior art interliners are not adaptable to bicycle tires. In addition, the prior art interliners are expensive to fabricate and difficult to properly install.

SUMMARY OF THE INVENTION

The present invention overcomes these and other disadvantages. It has a unitary construction with means to prevent relative movement within the tire and hence does not pinch or wear the inner tube. It is very flexible, and thus can yield when the tire strikes a bump or enters a hole. Because of its shape, the present invention limits buckling of the tire when the tire is deformed, for example, by the edge of a curb. Yet the present invention has a high resistance to penetration by puncturing debris. Because the present invention is made of a plastic material, it can be easily and inexpensively molded in narrow widths and very thin cross-sections. As a result, the present invention provides the required protection for an inner tube, is lightweight, and is easily installed.

In a preferred embodiment, the present invention comprises a tube guard for protecting air-filled inner tubes of relatively narrow tires. The tube guard is located when in use between the inner tube and the tire casing and is comprised of a unitary annular guard member which is made from a flexible plastic material. The guard member has an arcuate cross-section and includes an outer roughened surface which abuts the inner wall of the tire casing an inner smooth surface which abuts the outer surface of the inner tube.

Other features and advantages of the present invention will be disclosed in or apparent from the description of the preferred embodiments of the invention found hereinbelow.

DESCRIPTION OF THE PREFERRED EMBODIMENTS

With reference to the drawings, there is depicted a tube guard 10 in accordance with the invention. Tube guard 10 is to be used primarily with relatively narrow tires which have an outer casing and an inner air-inflated inner tube such as are found on bicycles.

Figure 1:
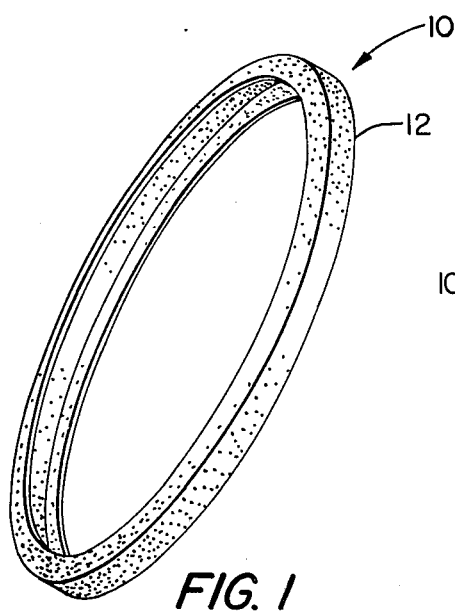
FIG. 1 is a perspective view of a tube guard in accordance with one embodiment of the invention.
Figure 3:
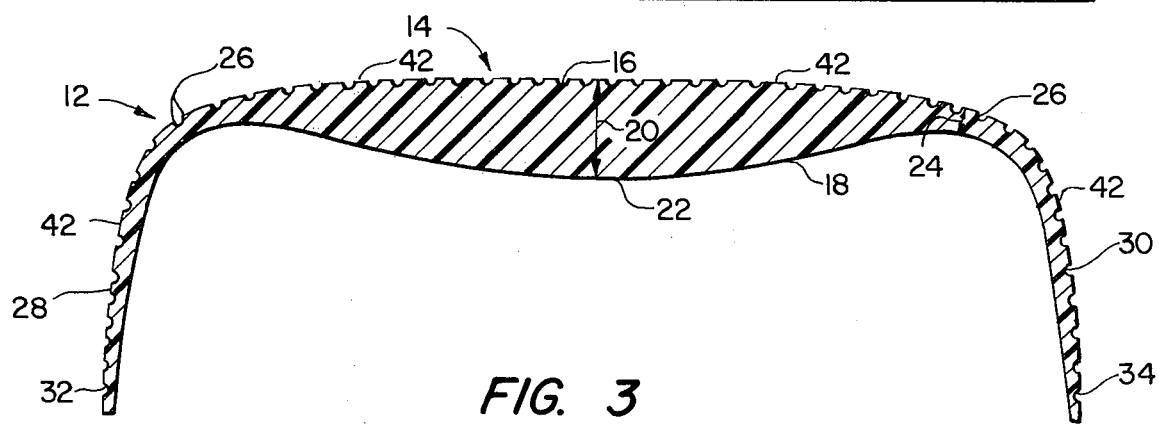
FIG. 3 is a cross-sectional view taken along line 3—3 of FIG. 1.

As best seen in FIGS. 1 and 3, tube guard 10 is comprised of a unitary annular guard member 12 which has a generally U-shaped arcuate cross-section. Guard member 12 includes a central section 14 which has in cross-section a generally flat upper surface 16 and a generally convex lower surface 18. Central section 14 thus has a maximum cross-sectional thickness shown by an arrow 20 at a mid portion 22 thereof and a minimum cross-sectional thickness shown by an arrow 24 at end portions 26 thereof. The mid portion cross-sectional thickness can be in the range of one-half inch to one-thirty second inch and preferably is in the range of one-sixteenth inch to one-thirty second inch. The preferred end portion cross-sectional thickness can be in the range of one-fourth inch to one-sixty fourth inch and preferably is in the range of one thirty-second inch to one sixty-fourth inch.

Guard member 12 further includes two generally parallel peripheral sections 28 and 30 integral with and extending radially inward from central section 14. Both peripheral sections 28 and 30 gradually taper from the junction with central section 14 at end portions 26 to their respective end portions 32 and 34. Thus the smallest cross-section of each peripheral section is at the respective end portion. The gradual tapering of peripheral sections 28 and 30 provides a greater degree of flexibility at end portions 32 and 34 so that tube guard 10 can more readily conform to the shape of the tire outer casing. However, peripheral sections 28 and 29 have sufficient rigidity so that any force deforming the tire such as that resulting from riding a bicycle over a curb, does not cause excessive buckling of the tire casing.

The standard size of bicycle tires is expressed as the major diameter of the tire to the minor diameter of the tire measured when the tire is flattened. Thus tires come in major diameters of 20, 26 and 27 inches and minor minor flattened diameters of 1¼; 1 ⅜; 1¾; and 2⅛ inch. The preferred dimensions of tube guard 10 is slightly smaller than the above dimensions so that tube guard 10 can fit concentrically inside a tire casing.

Figure 2:
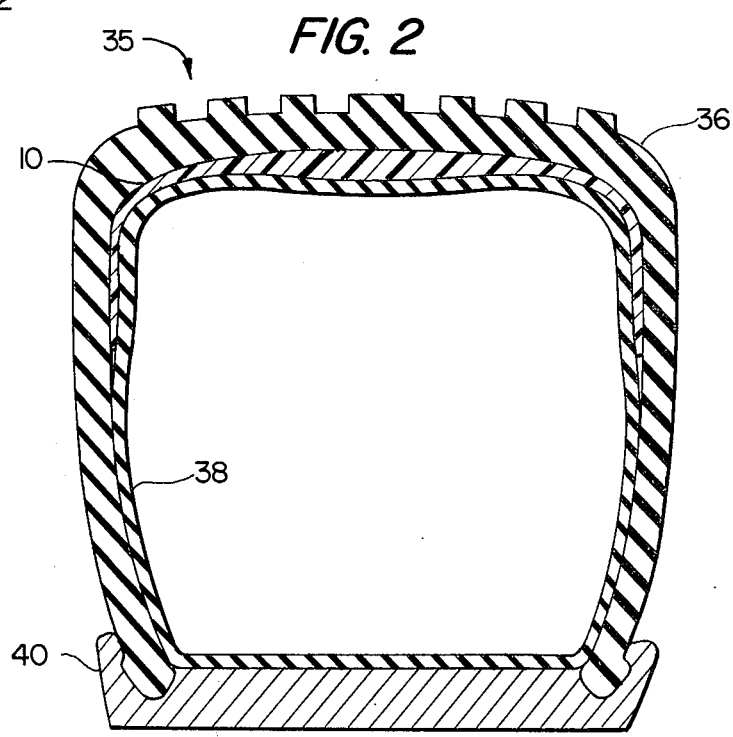
FIG. 2 is a cross-sectional view of the embodiment of the invention shown in FIG. 1 with the tube guard shown in place between the tire casing the inner tube.

In FIG. 2, a bicycle tire 35 is depicted with tube guard 10 in place between an outer rubber tire casing 36 and an inner air-inflated rubber inner tube 38. Tire casing 36 and inner tube 38 are mounted on a rim 40. The outer surface of tube guard 10 has a plurality of randomly distributed protrusions 42, as is best seen in FIG. 3, extending thereabove. Protrusions 42 provide tube guard 10 with a rough outer surface which prevents rotational slippage or movement of tube guard 10 relative to tire casing 36. The inner surface of tube guard 10 is smooth, thereby providing a generally frictionless surface with which inflated inner tube 38 can conform. At the normal inflation pressures, inner tube 38 can conform. At the normal inflation pressures, inner tube 38 is kept in a tight abutting relationship with tube guard 10. Thus any relative movement of inner tube 38 with respect to tube guard 10 is prevented. The smooth inner surface of tube guard 10 prevents any pinching of inner tube 38 when tire 35 is deformed by bumps or holes in the ground along which the tire is traveling.

As should be obvious to one skilled in the art, the outer surface of tube guard 10 can be given a roughened surface by a numerous geometrical design, such as by a plurality of annular ridges, and the present invention should not be limited to any particular design.

Figure 4:
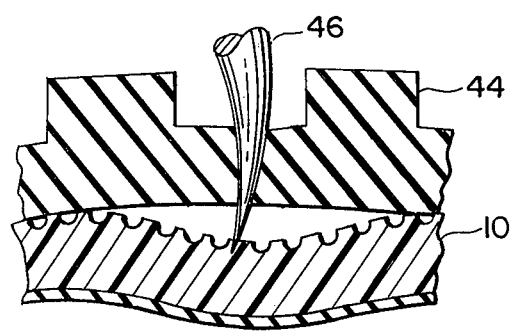
FIG. 4 is a diagrammatic representation of a partial cross-sectional view with somewhat exaggerated dimensions of a tire having a tube guard in place protecting an inner tube from a sharp, pointed object which has penetrated the outer tire casing.
Figure 5:
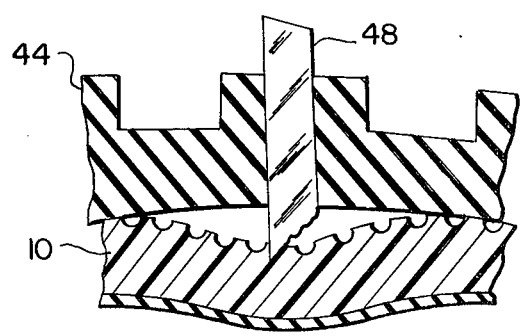
FIG. 5 is a diagrammatic representation of a partial cross-sectional view with somewhat exaggerated dimensions of a tire having a tube guard shown in place protecting an inner tube from a piece of glass which has penetrated the outer tire casing.

The preferred method of manufacturing tube guard 10 is to extrude it in one piece out of a solid flexible synthetic polymeric or plastic material. The amount of flexibility of the molded material is approximatey the same as the amount of flexibility of a conventional bicycle tire when inflated to its standard pressures which are normally 30 to 75 pounds per square inch. The selected plastic material when extruded should also have a resistance to penetration by sharp pointed objects such as nails or broken glass. A plastic material having a toughness or hardness of approximately 64 Shore D hardness ASTM, Test Method D-1706-61 meets the above requirements. One such plastic material which can be made to provide these properties is a polypropolene plastic. Other methods of manufacturing tube guard 10 would be obvious to one skilled in the art and can include, for example, molding tube guard 10 in one piece. FIGS. 4 and 5 respectively show diagrammatically the protecting features of an installed tube guard 10 when a tire casing 44 is penetrated by a nail 46 and a piece of broken glass 48.

Although the invention has been described in detail with respect to an exemplary embodiment thereof, it will be understood by those of ordinary skill in the art that variations and modifications may be effected within the scope and spirit of the invention.

I claim:

1. A tube guard for protecting air filled inner tubes of relatively narrow tires of a bicycle, said tube guard being located when in use between the inner tube and an outer rubber tire casing and comprising a singular annular guard member made entirely from a non-compressible, flexible solid plastic material having a high resistance to penetration, said guard member having a generally U-shaped arcuate cross-section and including a central section integral with two spaced apart, generally parallel peripheral sections which extend radially inward from said central section, the cross-sectional thickness of said central section being greatest at the midportion thereof and being least at the end portions thereof, the cross-sectional thickness of said guard member being less than the cross-sectional thickness of the tire casing, and wherein the cross-sectional thickness of said peripheral sections gradually tapers from the junction with said central section to the end thereof such that said peripheral sections have the smallest cross-section at the end portions thereof, said guard member further including an outer surface which, when in use, abuts the inner wall of the tire casing and a smooth inner surface which, when in use, abuts the outer surface of the inner tube.

2. A tube guard as claimed in claim 1 wherein said guard member is comprised of a solid flexible synthetic polymeric material shaped to generally conform to the internal shape of the tire casing.

3. A tube guard as claimed in claim 1 wherein said mid portion has a cross-sectional thickness of one-half to one thirty-second inch and said end portions have a cross-sectional thickness from one-quarter inch to one sixty-fourth inch.

4. A tube guard as claimed in claim 3 wherein the outer arcuate cross-sectional dimension of said central section is from 1 inch to 2½ inches and the diameter of said annular guard member is from 16 inches to 28 inches.

5. A tube guard as claimed in claim 1 wherein the outer arcuate cross-sectional dimension of said top section is from 1 inch to 2½ inches and the diameter of said annular guard member is from 16 inches to 20 inches.

6. A tube guard as claimed in claim 1 wherein said outer surface of said guard member has a plurality of protrusions extending thereabove thereby providing a roughened surface to prevent slippage of said tube guard relative to the tire casing.

* * * * *